United States Patent [19]

Martin

[11] Patent Number: 4,817,927
[45] Date of Patent: Apr. 4, 1989

[54] COIL TORSION SPRING MOUNTING CONES WITH GROOVE BREAK AND METHOD OF MOUNTING

[75] Inventor: David O. Martin, Salt Lake City, Utah

[73] Assignee: Martin Door Manufacturing, Salt Lake City, Utah

[21] Appl. No.: 898,533

[22] Filed: Aug. 21, 1986

[51] Int. Cl.⁴ .......................... F16F 1/08; F16F 1/12; E05F 1/08; F16B 7/02
[52] U.S. Cl. ...................................... 267/155; 16/299; 16/308; 160/191; 160/318; 185/45; 267/179; 403/229; 403/296
[58] Field of Search ............... 267/154, 155, 157, 170, 267/174, 175, 179, 180, 169, 167; 140/3 CA, 103; 16/76, 198, DIG. 1, DIG. 7, DIG. 10, 299, 308, 300; 160/191, 192, 318; 185/39, 44, 45; 116/201, 230, 314, 319; 403/229, 296; 40/913, 628

[56] References Cited

U.S. PATENT DOCUMENTS 3,779,537 12/1973 Kalister ............................... 267/179
4,475,725 10/1984 Niemann ............................ 267/179

FOREIGN PATENT DOCUMENTS 1187939 4/1970 United Kingdom ................ 160/191

Primary Examiner—Robert J. Oberleitner
Attorney, Agent, or Firm—J. Winslow Young

[57] ABSTRACT

This invention relates to a novel anchor cone and winding cone apparatus and method for mounting a coil torsion spring to an overhead door. Indicia are provided on the cones to assure proper orientation of the cones to the spring and the cone/spring assembly to the overhead door. The winding cone includes arrow indicia to clearly indicate the direction of rotation for the winding cone to increase tension on the coil torsion spring. A groove break is provided in each cone to substantially reduce chafing and wear of the corresponding coil of the coil torsion spring.

2 Claims, 2 Drawing Sheets

COIL TORSION SPRING MOUNTING CONES WITH GROOVE BREAK AND METHOD OF MOUNTING

BACKGROUND

1. Field of the Invention

This invention relates to a novel coil spring mounting cone apparatus and method and more particularly, to novel improvements in the anchor cone and winding cone attached to each end of a coil torsion spring.

2. The Prior Art

The overhead door is a well known fixture in many homes and businesses where it is used as a closure for large openings such as garage openings, loading docks, and the like. The overhead door derives its name from its function of being raised from its vertical, closure position to a horizontal or overhead, open position. Overhead doors used as closures for large openings are very heavy so that some form of counterbalance or spring system is commonly employed to compensate for at least a portion of the weight of the overhead door both during opening as well as closing of the overhead door.

The coil torsion spring has been adapted throughout the industry as one very efficient mechanism for providing the necessary forces to offset the weight of the overhead door. Customarily, the coil torsion spring is formed into a righthand and a lefthand section mounted over a torsion bar. The respective ends of the spring sections are anchored end-to-end by anchor cones secured to a wall-mounted bracket. The coil torsion spring is formed into two sections with the right and left hand winding to compensate for the axial forces exerted by each spring section as it coils and uncoils. The end-to-end mounting of the spring sections means that the axial force of each spring section is directed against the central mounting bracket.

The free ends of each section of spring are mounted to winding cones that are, in turn, adjustably secured to the torsion bar. The winding cones allow the operator to adjust the tension transmitted to the torsion bar by the individual sections of coil torsion spring. Set screws in the winding cones are used to releasably secure the winding cone to the torsion bar. Cable drums at each end of the torsion bar reel and unreel cable extending to the bottom edge of the overhead door so as to transmit the support forces provided by the coil torsion spring directly to the overhead door.

Each section of coil torsion spring is assembled at the factory with the appropriate winding cone and anchor cone mounted in the respective end. The external diameter of each cone at the terminal end is incrementally smaller than the internal diameter of the spring while the external diameter of the basal end is incrementally larger than the internal diameter of the spring so as to cause the spring to tightly grip the particular cone. Accordingly, during assembly the manufacturer "screws" a cone into the end of the spring and relies on the gripping action of the spring to securely hold the cone in place. Once mounted on the torsion bar, each spring contributes its torsional forces in the same rotational direction on the torsion bar.

The coil torsion springs are each designated as either right wound or left wound. It has been customary in the trade to place the left wound spring with its winding cone on the right side of the coil torsion spring assembly (when viewed from inside the garage). The left winding cone is painted black as an indicator for its location on the right side. Correspondingly, it is also customary to place the right wound spring with its right winding cone on the left side of the coil torsion spring assembly. The right winding cone is painted red to indicate its placement on the left side of the coil torsion spring assembly. Confusion frequently occurs in determining the correct placement for the black and red winding cones. However, even more confusion exists as to which direction the black-painted and red-painted winding cones should be rotated to impart the desired increase in tension on the coil torsion spring assembly.

The foregoing confusion as to direction of rotation is particularly relevant since an inexperienced operator will, upon casual observation of a coil torsion spring and the manner in which it is secured to the winding cone, conclude that to increase tension on a coil torsion spring it is necessary to attempt to "screw" the winding cone more tightly to the spring whereas the opposite is the correct direction of rotation. In other words, it is necessary for the operator to appear to be attempting to "unscrew" the winding cone in order to increase tension on the spring.

Further, it is estimated that an overhead door is subject to hundreds of cycles during each year of installation over the opening to the garage in a dwelling. I have discovered that the conventional anchor cone and winding cone each terminate in a surface that is perpendicular to the axis of the cone. This surface presents an extended surface over which the corresponding coil of spring rubs or chafes during each cycle of the overhead door with a substantial increased incidence of breakage at that point.

It would, therefore, be an advancement in the art to provide improvements in anchor cones and winding cones as well as methods for mounting the coil torsion spring to the anchor cones and winding cones. It would also be an advancement in the art to provide anchor cones and winding cones with indicia to clearly indicate which side the coil torsion spring assembly the particular section of coil torsion spring is to be mounted. Another improvement would be a winding cone with arrows indicating the direction the winding cone is to be rotated to increase tension on the coil torsion spring. Another advancement would be to provide an abrupt termination of the spiral groove on the frustoconical face of the anchor cone and the winding cone to reduce chafing and wear on the corresponding spring coil during cycling of the coil torsion spring. Such a novel apparatus and method is disclosed and claimed herein.

BRIEF SUMMARY AND OBJECTS OF THE INVENTION

This invention relates to novel improvements in an anchor cone and winding cone apparatus and method for supporting a coil torsion spring for an overhead door. The anchor cones and winding cones include indicia for aiding the manufacturer in the correct placement of the respective anchor cone and winding cone to the section of coil torsion spring. Indicia on the winding cone clearly illustrate to the installation person not only the proper placement of the particular section of coil torsion spring but also the correct direction the winding cone must be rotated in order to increase the tension on the coil torsion spring. Each of the anchor cone and the winding cone include a spiral groove on the frustoconical face thereof with the spiral groove terminating abruptly in a groove break so as to reduce rubbing and chafing of the corresponding coil of the coil torsion spring during each cycle when the respective coil "falls off" the particular anchor cone or winding cone.

It is, therefore, a primary object of this invention to provide improvements in anchor cones and winding cones for a coil torsion spring.

Another object of this invention is to provide improved methods for supporting a coil torsion spring for an overhead door.

Another object of this invention is to provide a groove break at the terminal end of the anchor cone and the winding cone so as to reduce chafing of the corresponding coil of the coil torsion spring during each cycle of the coil torsion spring.

Another object of this invention is to provide a winding cone with indicia to clearly indicate placement of the winding cone and the coil torsion spring mounted thereon in relationship to the overhead door.

Another object of this invention is to provide a winding cone with indicia to indicate the direction of rotation of the winding cone to increase tension on the coil torsion spring to which it has been mounted.

Another object of this invention is to provide a winding cone embossed with the color name for the color coding of the winding cone.

These and other objects and features of the present invention will become more fully apparent from the following description and dependent claims taken in conjunction with the accompanying drawing.

DETAILED DESCRIPTION OF THE PREFERRED EMBODIMENTS

Figure 1:
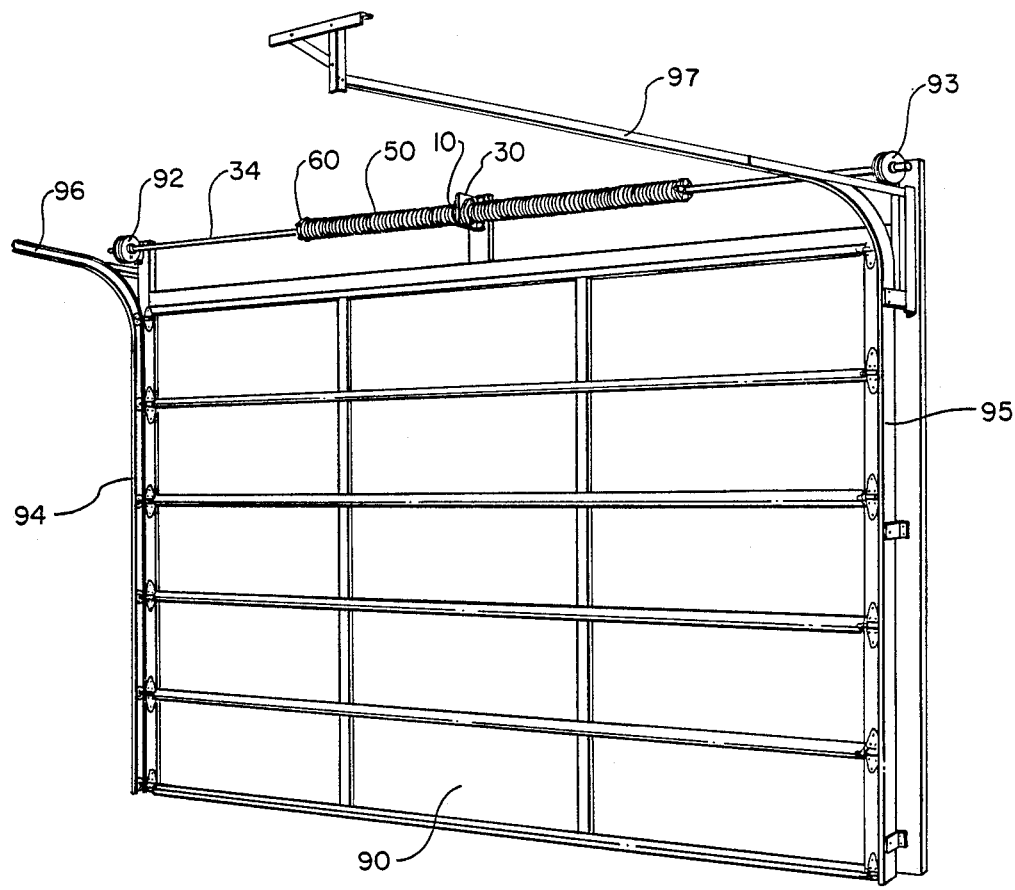
FIG. 1 is a perspective view of the novel anchor cone and winding cone apparatus of this invention shown in the environment of a coil torsion spring and an overhead door.

The novel anchor cone and winding cone of this invention is best understood by reference to the drawing wherein like parts are designated by like numerals throughout.

Figure 2:
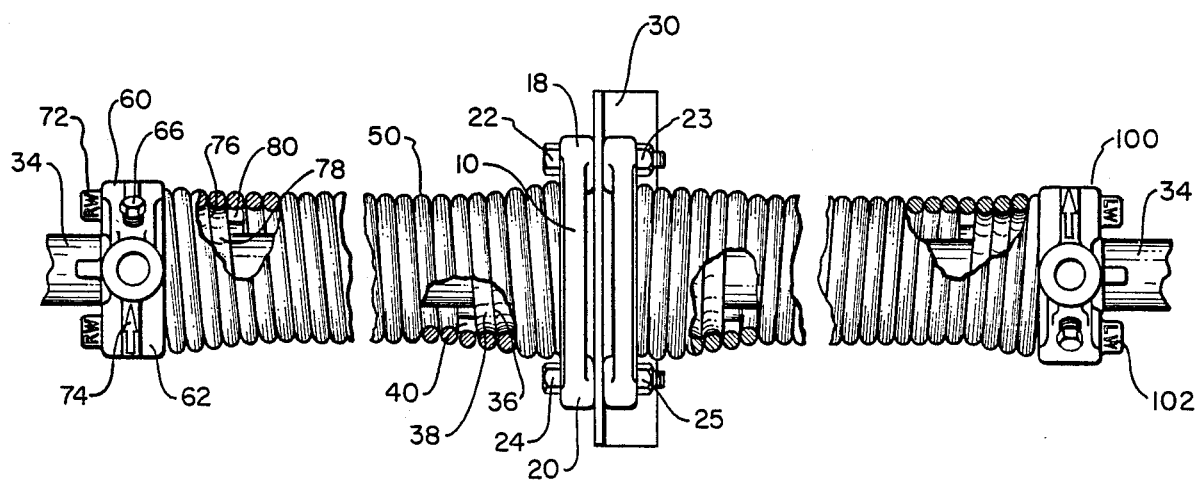
FIG. 2 is an enlarged view of the anchor cone and winding cone of FIG. 1 shown in the environment of the coil torsion spring with portions broken away to reveal details ordinarily hidden by the coil torsion spring.
Figure 3:
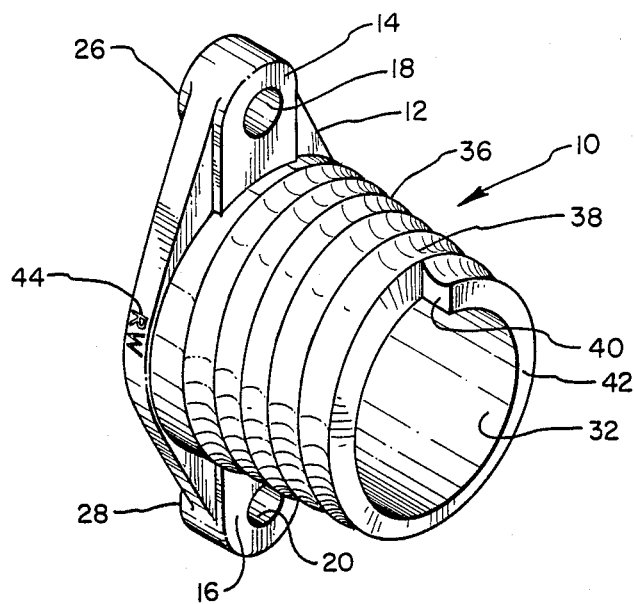
FIG. 3 is an enlarged, perspective view of an anchor cone.

Referring now to the drawing, the anchor cone is shown generally at 10 in full detail in FIG. 3 and in the environment of the coil torsion spring in FIGS. 1 and 2. Anchor cone 10 includes a mounting base 12 having two extensions 14 and 16 extending therefrom with apertures 18 and 20, respectively, therein. Apertures 18 and 20 serve as bolt-receiving apertures for bolts 22 and 24 therethrough, respectively (FIG. 2), with bolts 22 and 24 being secured by nuts 23 and 25, respectively. Raised bosses 26 and 28 around apertures 18 and 20, respectively, support mounting base 12 away from a mounting bracket 30 (FIG. 2) so as to provide a more secure engagement between anchor cone 10 and bracket 30.

Anchor cone 10 includes a hollow interior 32 dimensionally adapted to telescopically receive a torsion rod 34 (FIGS. 1 and 2) passing therethrough in rotatable relationship. The exterior face of anchor cone 10 surrounding hollow interior 32 is configured in a frustoconical surface 36 having a spiral groove 38 formed in the face thereof. Spiral groove 38 traverses a spiral path over the face of frustoconical surface 36 from a groove break 40 on a leading face 42 to a terminus adjacent mounting base 12. The groove break 40 is formed as a terminating edge transverse to the axis of the groove. An indicia 44 (in this instance the initials RW) on mounting base 12 serves as an indicator as to which end of a coil torsion spring 50 it is to be mounted. In this instance, anchor cone 10 is a right wound (RW) anchor cone and is mounted to a right wound spring 50.

Figure 4:
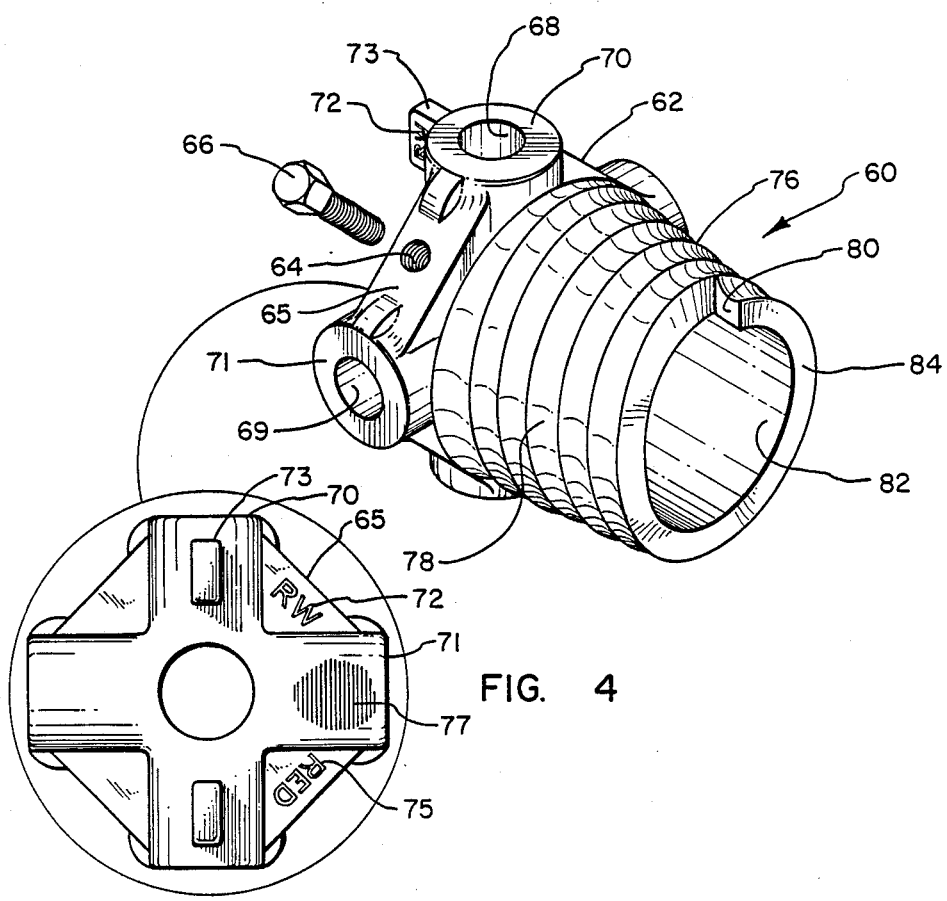
FIG. 4 is an enlarged, perspective view of a winding cone with a fragmentary view of the end of the winding cone.

Referring now more particularly to FIG. 4, the novel winding cone of this invention is shown generally at 60 and includes a base 62 having a set screw-receiving aperture 64 therein for receiving a set screw 66. Base 62 also includes a plurality of tool-receiving apertures 68 and 69 therein for the purpose of releasably receiving a tool (not shown) to allow the operator (not shown) to apply the necessary rotational forces to winding cone 62 so as to selectively adjust the torsional tension on coil torsion spring 50. Added mechanical strength is provided to tool-receiving apertures 68 and 69 by a raised boss 70 and 71, respectively, surrounding the same since considerable forces are transmitted to winding cone 60 in order to selectively adjust the tension on coil torsion spring 50.

Indicia are provide on winding cone 60 in the form of indicia 72 (in this instance, the letters RW) on a raised tab 73 to indicate that winding cone 60 is mounted to a right wound coil torsion spring 50. Additional indicia 72 (the letters RW) are also found on a web 65 between raised bosses 70 and 71. Importantly, an indicia 75 is also included on winding cone 60 and is shown in this instance as the word RED (indicia 77) to clearly indicate to the appropriate manufacturing personnel that winding cone 60 is to be painted the color red (indicia 77) to conform with the current practice in the industry. This feature is important since it will effectively eliminate painting a right wound winding cone (RW, indicia 72) any color other than the color red. It should be noted that winding cone 60 is shown as a right wound winding cone that is marked to be painted red (indicia 75) while the left wound (LW, indicia 102) winding cone 100 (FIG. 2) on the right side will have a corresponding color designation, namely, BLACK, (not shown).

Another indicia, arrow 74 (FIG. 2), is also provided on base 62 to serve as a guide for the operator (not shown) to indicate the direction of rotation for winding cone 60 in order to selectively increase tension on coil torsion spring 50. This feature is particularly important since a casual observer looking at the orientation of coil torsion spring 50 shown on the left side in FIG. 2 would generally assume that in order to increase tension on coil torsion spring 50 it would be necessary to attempt to "screw" winding cone 60 deeper into coil torsion spring 50 by rotating winding cone 60 in a direction opposite arrow 74. This has happened numerous times with prior art devices, occasionally with disastrous results due to the tensions incorporated in conventional coil torsion springs. The correct direction of rotation of winding cone 60 is indicated by arrow 74 so as to overcome the reluctance by the operator (not shown) against apparently "unscrewing" winding cone 60 from coil torsion spring 50 in order to increase tension therein.

Winding cone 60, like anchor cone 10 (FIGS. 2 and 3) includes a frustoconical face 76 having a spiral groove 78 therein extending between a groove break 80 in a leading face 84 to and extending to base 62. The groove break 80 is formed as a terminating edge transverse to the axis of the groove. A cylindrical hollow 82 is dimensionally configured to telescopically receive torsion bar 34 therethrough and to accommodate set screw 66 securely and releasably engaging winding cone 60 to torsion bar 34.

Groove break 40 and groove break 80 are important features since coil torsion spring 50 changes diameter during each phase of its cycle during opening and closing of overhead door 90. For example, during the closing portion of the cycle the overhead door 90 is lowered thereby increasing the weight to be compensated by increased tension imparted to coil torsion spring 50. The increased tension is created in coil torsion spring 50 by axially twisting it more tightly which means the respective coils passing over groove breaks 40 and 80 decrease to a diameter smaller than the diameter of the terminal end of the respective anchor cone 10 or winding cone 60. The absence of groove breaks 40 and 80 as found in conventional anchor and winding cones would mean that the corresponding coils would chafe or rub against the end of the anchor cone and winding cone with a substantial decrease in the operating life of the coil torsion spring. This problem has been effectively eliminated by the novel feature of groove breaks 40 and 80 of this invention.

THE METHOD

The novel method of this invention includes obtaining the appropriate sets of anchor cones 10 and winding cone 60. A right wound anchor cone and a right wound winding cone are provided for the left side of the coil torsion system illustrated in FIGS. 1 and 2 and a left wound anchor cone and a left wound winding cone for the right side. Each set of anchor cone and winding cone is mounted to an appropriate section of coil torsion spring 50. Advantageously, the appropriate indicia are included as an integral part of the respective anchor cones and winding cones so as to enable the installation person to correctly install the particular section of coil torsion spring and, subsequently, to apply the appropriate torsional forces to the coil torsion spring upon rotation of the particular winding cone.

Initially, the coil torsion spring with the anchor cone and the winding cone attached is telescopically mounted over the torsion rod 50 with the proper orientation of the respective coil torsion spring 50 with respect to bracket 30 as indicated by the indicia as discussed hereinbefore. It is the practice in the industry to mount a right wound coil torsion spring on the left side of bracket 30 and a left wound coil torsion spring on the right side of bracket 30 so as to provide the correct direction of rotation to torsion rod 34. The completed assembly then includes a pair of back-to-back anchor cones 10 mounted to bracket 30 (FIGS. 1 and 2) with the opposite ends of the respective coil torsion spring mounted to the respective winding cones. Each end of the torsion rod 34 has a cable drum 92 and 93 (FIG. 1) mounted thereto with a cable extending therefrom and secured adjacent the bottom of overhead door 90.

With correct tension applied to coil torsion spring 50 (and its corresponding counterpart on the right side of bracket 30) overhead door 90 is easily raised along vertical tracks 94 and 95 to the open or overhead position in horizontal tracks 96 and 97.

During the cycling of the coil torsion spring apparatus as described herein, the particular coils of coil torsion spring 50 that drop off and reengage anchor cone 10 winding cone 60 is substantially protected against chafing or rubbing by the corresponding groove break 40 on anchor cone 10 and groove break 80 on winding cone 60. This novel feature has proven to greatly extend the operating life of the coil torsion spring 50.

Further, and advantageously, the respective indicia on anchor cone 10 and winding cone 60 substantially minimizes, if not eliminates, improper installation of the coil torsion spring 50 and, more particularly, the arrow indicia 74 on winding cone 60 effectively eliminates confusion and mistake when imparting the desired degree of tension to coil torsion spring 50. This is an important feature for safety considerations due to the substantial forces that must be imparted to coil torsion spring 50 in order to supply the necessary torsional forces or the raising and lowering of garage door 90 (FIG. 1).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A coil torsion spring mounting apparatus for reducing chafing of a coil torsion spring comprising:

an anchor cone for a first end of the coil torsion spring comprising a frustoconical outer surface having a basal end and a terminal end, the external diameter of the terminal end being incrementally smaller than the internal diameter of the coil torsion spring and the external diameter of the basal end being incrementally larger than the external diameter of the terminal end so as to cause a plurality of the end coils at the first end of the coil torsion spring to tightly grip the anchor cone, the anchor cone including a spiral groove on the frustoconical outer surface extending from the terminal end to the basal end and having a contour in the groove corresponding to the external diameter of a spring wire that forms the coils of the coil torsion spring, the groove corresponding to the coils of the first end of the coil torsion spring and terminating at a groove break formed as an edge transverse to the axis of the groove, the anchor cone including anchor means for anchoring the anchor cone to a bracket, first indicia means on the anchor cone for indicating the direction of mounting the anchor cone to the first end of the coil spring; and a winding cone for a second end of the coil torsion spring comprising a frustoconical outer surface having a basal end and a terminal end, the external diameter of the terminal end being incrementally smaller than the internal diameter of the coil torsion spring and the external diameter of the basal end being incrementally larger than the external diameter of the terminal end so as to cause a plurality of the end coils at the second end of the coil torsion spring to tightly grip the winding cone, the winding cone including a spiral groove on the frustoconical outer surface extending from the terminal end to the basal end and having a contour in the groove corresponding to the external diameter of the spring wire that forms the coils of the coil torsion spring, the groove corresponding to the coils of the second end of the coil torsion spring and terminating at a groove break formed as an edge transverse to the axis of the groove, the winding cone including winding means for rotating the winding cone in a preselected direction so as to selectively increase the coil tension of the coil spring, second indicia means on the winding cone to indicate the proper mounting orientation of the winding cone to the second end of the coil torsion spring, third indicia means on the winding cone to indicate the proper placement of the coil torsion spring relative to the overhead door, fourth indicia means on the winding cone to indicate the direction of rotation of the winding cone to create said increase in tension of the coil spring, and fifth indicia means on the winding cone to indicate the color the winding cone is to be colored.

2. A method for mounting a coil torsion spring to an overhead door comprising:
   forming an anchor cone with mounting means for mounting the anchor cone to a bracket, the anchor cone comprising a frustoconical surface having a basal end and a terminal end with a spiral groove in the frustoconical surface between the terminal end and the basal end;
   preparing a winding cone with winding means for rotatably winding cone and securement means for releasably securing the winding cone to a torsion bar, the winding cone comprising a frustoconical surface having a basal end and a terminal end with a spiral groove in the frustoconical surface between the terminal end and the basal end;
   placing a first indicia on the anchor cone to indicate whether the anchor cone is for a right wound or a left wound coil torsion;
   placing a second indicia on the winding cone to indicate whether the winding cone is for a right wound or a left wound coil torsion spring and a third indicia on the winding cone to indicate proper placement of the coil torsion spring relative to the overhead door and a fourth indicia on the winding cone to indicate the proper direction of rotation of the winding cone to increase tension on the coil torsion spring and a fifth indicia on the winding cone to indicate the color the winding cone is to be colored;
   inserting the anchor cone in a first end of the coil torsion spring by engaging the end coils of the first end of the coil torsion spring in the spiral groove of the anchor cone;
   inserting the winding cone in a second end of the coil torsion spring by engaging the end coils of the second end of the coil torsion spring in the spiral groove of the winding cone;
   reducing chafing between the terminal end of the anchor cone and the corresponding coil of the first end of the coil torsion spring by forming a groove break as an edge transverse to the groove at the terminal end of the anchor cone; and
   reducing chafing between the terminal end of the winding cone and the corresponding coil of the second end of the coil torsion spring by forming a groove break as an edge transverse to the groove at the terminal end of the winding cone.

* * * * *